United States Patent [19]
Raser

[11] 3,872,854
[45] Mar. 25, 1975

[54] SUNLIGHT CONCENTRATOR FOR ENERGY CONVERSION

[76] Inventor: William H. Raser, 6451 W. 83rd St., Los Angeles, Calif. 90045

[22] Filed: Feb. 7, 1974

[21] Appl. No.: 440,522

[52] U.S. Cl. .............................................. 126/270
[51] Int. Cl. .............................................. F24j 3/02
[58] Field of Search ............... 60/26; 126/270, 271

[56] References Cited
UNITED STATES PATENTS

| 683,088 | 9/1901 | Wideen | 126/270 |
| 1,951,404 | 3/1934 | Goddard | 126/270 |
| 2,760,920 | 8/1956 | Olsen | 126/270 X |
| 3,521,967 | 7/1970 | Archer | 126/270 X |
| 3,613,659 | 10/1971 | Phillips | 126/270 |
| 3,797,476 | 3/1974 | Tarcici | 126/270 |

Primary Examiner—William F. O'Dea
Assistant Examiner—Peter D. Ferguson

[57] ABSTRACT

An array of mirrors for focusing the sun's rays onto a steam-generating boiler. Mirrors are mounted on a large ring to serve as a variable-focal-length parabolic reflector. A second reflector with versatile position control is used in focusing sunlight onto a boiler which occupies a fixed position relative to the ground.

11 Claims, 3 Drawing Figures

PATENTED MAR 25 1975

SUNLIGHT CONCENTRATOR FOR ENERGY CONVERSION

This invention relates to equipment which draws energy from reflected sunlight. One purpose is the generation of electric power from steam. A second purpose has to do with other methods of energy conversion.

As oil becomes less plentiful, greater need for solar power is being recognized. One of the results of this recognition has been increased efforts to reduce the cost of producing photovoltaic cells. At present, these efforts have not been fruitful as solar cell power still costs over one hundred times the cost of power generation by other methods. Therefore, a non-thermal use for this sunlight concentrator could be to reduce the required size and, hence, cost of photovoltaic cells whenever they are used.

Another result of this recognition has been the development of wavelength discriminating materials known as selective surfaces. Selective surfaces can be used to increase the ratio of absorbed energy to the lost or emitted energy when a body is placed in sunlight. They do this by being selective with respect to radiation frequency or wavelength. Approximately 90% of the solar spectrum is at wavelengths shorter than 1.3 microns, whereas the escaping radiation is infrared and occurs almost entirely at wavelengths above 1.3 microns. Thus, selective surfaces applied to a boiler in sunlight can increase the temperature because they can receive energy easily like a black body but avoid excessive emission losses by having outgoing radiation characteristics like that of a white body. The combination of a selective surface and a sunlight concentration is especially effective in producing high temperatures at a boiler.

The primary object of this invention is to provide sustained optical concentration of sunlight required for efficient energy conversion using a heat-absorbing surface in a fixed position. Since the sun position changes, this requires suitably controlled movements of reflecting surfaces.

The secondary object of this invention is to permit economical installation in remote and rugged areas. In some remote areas, many telephone poles have been installed easily into hand-dug holes by helicopter; a similar structure could have its installation problem solved the same way. A shank-base type of structure is therefore desirable. Also, the number of mechanical moving parts should either be a minimum or be inexpensive to produce and to assemble.

Some arrid regions experience sandstorms which adversely affect the optical properties of glass. Therefore, another object is to provide a means for covering all reflecting surfaces whenever a sandstorm alert signal is received.

A first exemplary, non-specifically-limiting embodiment of the invention is illustrated in two figures of the accompanying page of drawing.

Figure 3:
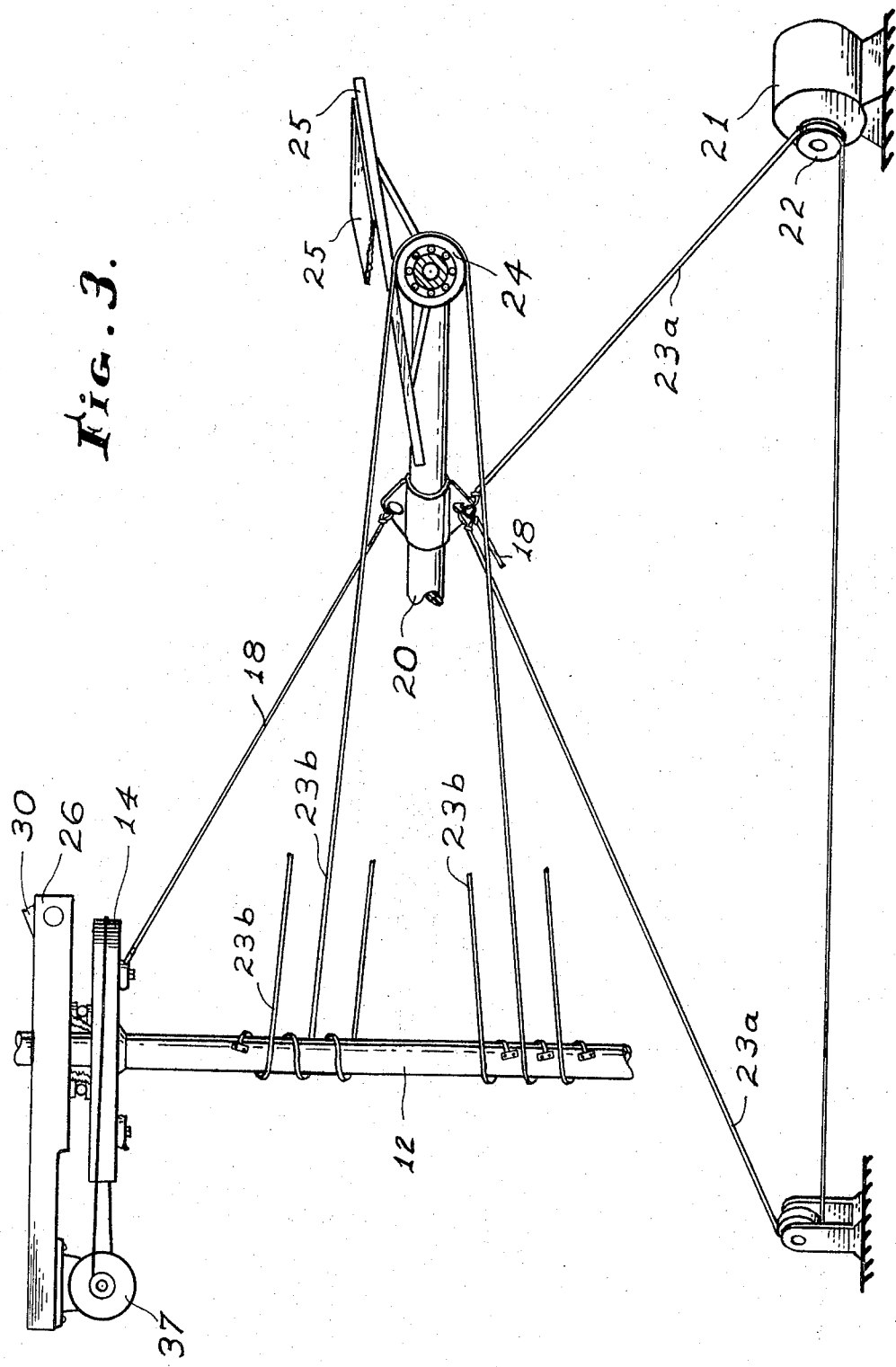

A second exemplary, non-specifically-limiting embodiment is illustrated in FIG. 3 on an accompanying second page of drawing.

Figure 2:
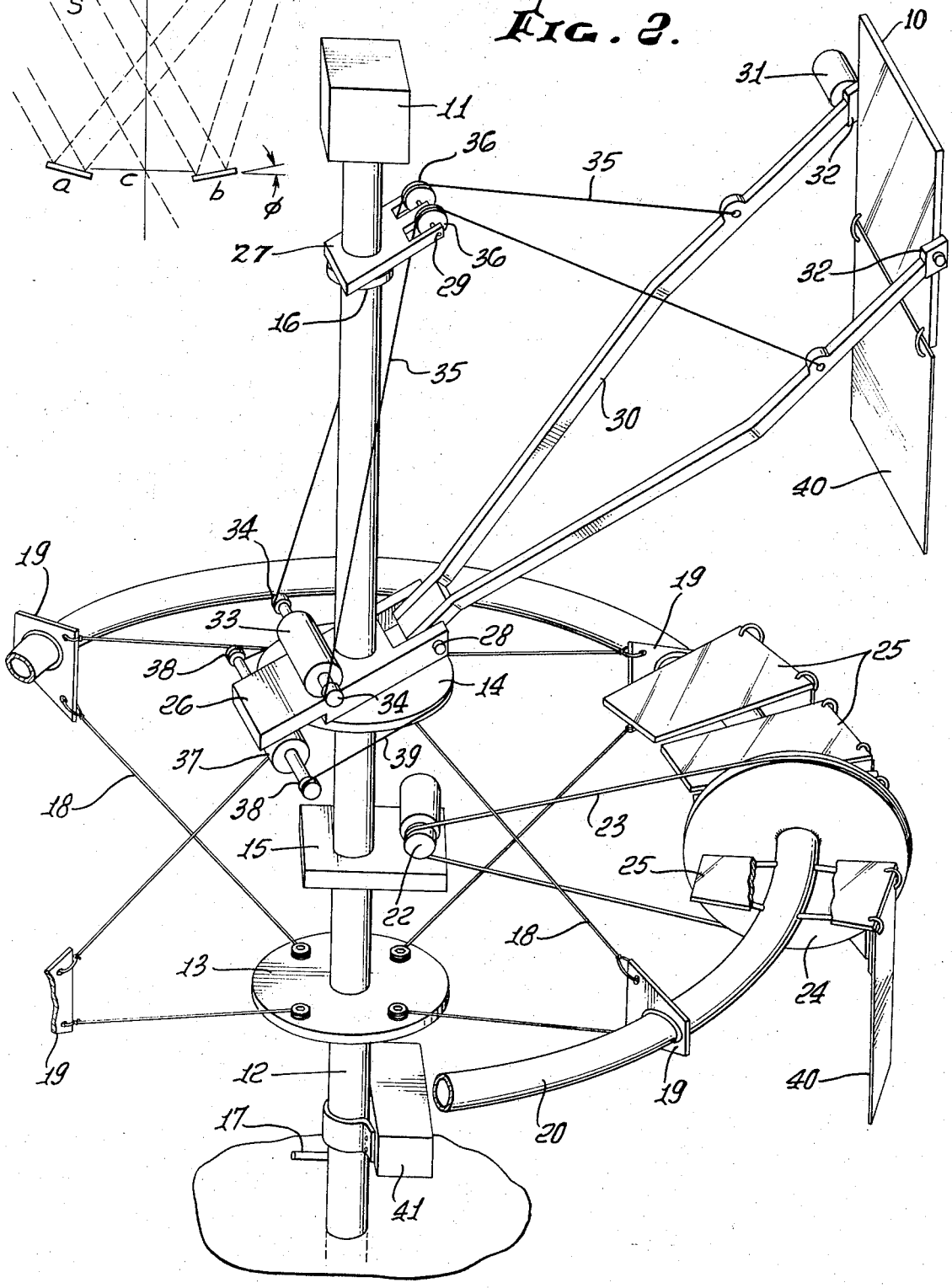
FIG. 2 is a perspective view from a slightly different direction from that of FIG. 1 and with some parts cut away, including some of the mirrors represented by a,b in FIG. 1.

FIG. 3 is an elevation view showing parts of the second embodiment which differ from those shown in FIG. 2.

The structural base of the apparatus is a vertical mast 12 with its lower end mounted in the ground or imbedded in concrete. Attached to this mast are two hub discs 13,14, a platform 15 between these discs, and a flange 16 above them. On top of the mast is mounted the heat-absorbing surface 11 which may be the surface of a boiler used to generate steam. Running lengthwise through the mast and thermally insulated from it is a steampipe 17 or other means of transmitting heat energy from the absorbing surface.

By means of long tension rods 18, 18 and bearing plates 19, 19, a large tubular ring 20 is held in a non-vertical plane concentric to the mast. The structural arrangement of this combination of discs, rods and ring is very similar to the arrangement of hub flanges, spokes and rim of a bicycle wheel except that the bearing plates 19, 19 allow one degree of freedom between the ring, 20 and rods 18, 18 that does not exist between the rim and the spokes of a bicycle wheel. This degree of freedom is a simultaneous rotation of every cross section of the ring by some angle, $\phi$ with no change in the location of the ring 20 or of the bearing plates 19, 19. This angle change, $\phi$ is called the inversion angle and is permitted by one bearing in each bearing plate 19.

The design of the ring reflects two important features of this embodiment. First, in order to have large power generating capacity, the ring must be large. Second, in order to change a certain optical characteristic which is analogous to a focal length, the elastic properties of the ring must be such that inversion angle change is facilitated; that is, it must be possible for the torsional resistance to change of $\phi$ to be overcome by a control motor 21 with sheave 22, a belt 23, and a large sheave 24 mounted on some section of the ring. This motor is accurately mounted on platform 15. Accurately mounted on the ring are a number of mirrors 25, 25.

Rotatably mounted around the mast in horizontal planes is a plate 26, and a swivel 27; these are supported by the upper disc 14 and the flange 16, respectively. To each of these is attached a pin, pin 28 and pin 29, respectively. A boom 30 is rotatably mounted on pin 28 and carries a control motor 31 and a large reflector 10. This could be a slightly concave reflector but usually is just a plane mirror with the reflecting side toward the mast. It is mounted to rotate about a horizontal axis by means of two bearings 32, 32 on the boom 30. Measuring from a position where the reflecting side is downward, the position angle of this reflector is $\beta$ and is controlled by the motor 31.

The elevation angle of the boom is called $\theta$. This angle is controlled by a control motor 33 which has its shaft available at both ends. On each end is a small drum 34, 34. This motor is mounted on plate 26. Each small drum winds up a cable 35, 35 which is attached to the boom 30. On the way to the boom, these cables run over idler pulleys 36, 36 mounted on pin 29.

The vertical plane containing the elevation angle, $\theta$ is at some azimuth angle, $\psi$ about the mast. This angle is the position of the length of plate 26. It is also the angle of the swivel 27 because of tension on the cables 35, 35. To control $\psi$, a second double-ended control motor 37 is mounted on the plate. Each end also has a cable-wound drum 38, 38; the cable to these drums engages the outer surface of the upper disc 14. Since this disc is fixed to the mast and since the two drums 38, 38 are wound in opposite directions, the azimuth angle of the boom is controlled by the motor 37 and its cable 39.

Some regions having an abundance of sunshine are desert regions noted for having troublesome sandstorms. Covers 40, 40 are sometimes needed on these occasions to protect the large mirror 10 and the many small mirrors 25, 25 from surface erosion. Each of these covers hangs from one edge of the mirror which it covers; when its mirror rotates to the proper angle, each cover will be resting on top of its mirror. Reversals of these rotations will uncover the mirrors. A mechanism for tying down these covers is not shown.

The controls for the four control motors are located in a control box 41. Since each motor is a servomechanism, it nulls at some electrical representation (analog or digital) of desired angle which is computed inside the control box. The motor wires are not shown. Also inside the box are batteries, clocks and small computing circuits.

There are two general ways in which the above four desired angle functions can be controlled, namely, mostly open loop controls and mostly closed loop controls. Table I summarizes how the open loop functions are obtained. In this table, time represents time of year as well as time of day; i.e., it includes all information about the position of the sun with respect to the location of the mast at any time. A fifth angle function, which is called teetering angle is included in this table but is listed in parentheses because it is not a part of this first embodiment.

| Channel or Motor | Angle Controlled | Independent Variables |
|---|---|---|
| Azimuth | $\psi$ | time (also $\tau$) |
| Boom pitch | $\theta$ | time (also $\tau$) |
| Reflector angle | $\beta$ | $\theta$ |
| Inversion angle | $\phi$ | $\theta$ |
| (Teetering angle | ($\tau$) | (time) |

Table I. Controlled Angle Functions

Figure 1:
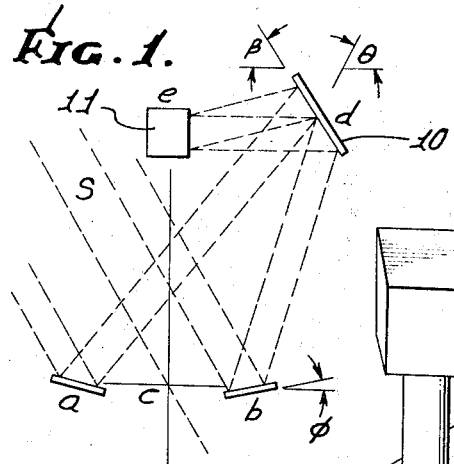
FIG. 1 is an elevation showing rays of sunlight coming past a point s, being reflected by mirrors a,b, being reflected a second time by a mirror 10, and being focused on an absorbing surface 11.

All of these angles except $\tau$ are changing constantly because the sun changes position. They can be understood by considering all mirrors except the upper mirror 10 to form a reflector which is approximately equivalent to one big parabolic mirror having a focal length L, where, from FIG. 1, $$L = \overline{cd} + \overline{de} \quad (1)$$

In other words, the azimuth control aims to keep the sun $s$, the center of the equivalent parabolic mirror $c$ and the center of the reflector $d$ all in one plane. The pitch control conforms to the angle of incidence, angle $sce$ which must be equal to the angle of reflection, angle $ecd$. A similar incidence-reflection condition determines $\beta$. And finally, $$\overline{cb} = L \tan 2\phi \quad (2)$$

If closed loop controls are selected, one or more of the above angle functions are determined instead by feedbacks of differential photoelectric signals in a manner known to those familiar with the art. In either case, photoelectric thresholds may be used for turning on and off the servos and wind velocity sensors could be used to trigger suitable mirror-covering sequences.

In this first embodiment, the ring 20 must be large but slender to permit generating, say, 25 kilowatts of electrical energy; the ring might need to have a radius of 35 feet but have a cross section diameter of only one-half inch. The allowable limit of cross section has to do with elastic properties of the ring material which could be steel.

It has been pointed out that the elastic properties of the ring must not prevent control motor 21 from satisfying the required $\phi$ condition. This required condition is given by equations (1) and (2), where L is a function of $\theta$ and, hence, of sun position. To illustrate the problem, consider a ring design that is not acceptable. An unacceptable ring 20 is one having zero residual stresses at any value of $\phi$.

To consider why a ring with the above dimensions and with zero initial stresses would be unacceptable, consider 180° of inversion angle at one station; that is, rotate one single cross section of the ring by one half revolution. Consider what would happen if all cross sections followed by rotating 180° in the same way a rubber band can sometimes be inverted by twisting just one section. The innermost fiber around the ring and the outermost fiber around the ring would exchange dimensions, the maximum strain would be 0.000903, the maximum stress would be 26,200 psi and the total work done on the ring would be 37.7 in. lbs. During this half rotation, a peak torque of 18.8 lb.in. is required. A torsion bar with this section and with a length equal to one quadrant of this ring has a torsional stiffness of 42.0 lb.in./radian. From these torques, it can be shown that almost half a radian of lost inversion angle could occur at some mirror on the ring that is remote from the section where the inverting torque is applied. In other words, the mirrors would not operate to provide a uniform focal length.

An entirely different situation occurs if the ring is fabricated from a tube of the correct circumferential length with its ends cut at exactly right angles from its length and held at perfect facing while they are welded together. Such a tube will have residual hoop stresses proportional to ring radius minus mean radius; i.e., the outer fiber will be in tension and the innermost fiber will be in compression. If this ring is made of perfectly elastic material, inverting either one or all cross sections will cause a net change of total strain energy of zero. In this case, the causes of inversion angle errors will be minor causes like bearing friction and metal hysteresis. A ring fabricated in this way would be acceptable.

A ring that is acceptable is so because it responds to control motor 21 in an acceptable way, i.e., it changes the inversion angle, $\phi$ of all mirrors 25,25 equally or almost equally. If all mirrors have the same inversion angle, reasonably accurate focusing is possible and L can be controlled to conform to equation (1). This means that the boiler can remain in a fixed position and receive a heavy concentration of sunlight for all sun positions relative to the earth as long as the $\psi$, $\theta$, $\beta$, and $\phi$ controls are maintaining their intended or computed positions.

The above discussion has involved the inversion angle, $\phi$ to a large extent whereas implementation of $\psi$, $\theta$ and $\beta$ controls has been given little attention. This is only because the inversion angle is more difficult and expensive to implement; it is not because it is any more important than the other three angles from an accuracy standpoint. In fact, for a number of reasons including the impossibility of perfect focusing even if $\phi$ were uniform, accurate $\phi$ control is not essential; for this reason, a certain amount of torsional flexibility in the ring can be tolerated. But limits to smallness of ring cross section exist and are related to the amount of wind velocity that can be tolerated.

A first embodiment of this invention has been described. It achieves simplicity by having a number of mirrors 25,25, each rigidly attached to a section of a large slender ring, 20. It achieves this simplicity because, although there may be many such mirrors, there may be a fewer number of places around the ring where it is necessary to control the twist angle or inversion angle of the cross section of the ring and still provide a correct and reasonably accurate focal length. Indeed, FIG. 2 illustrates only one such place for control, namely, the cross section where sheave 24 is attached.

A second embodiment can be visualized easily because it is an obvious alternative to the above method of achieving control of $\phi$ without requiring a separate motor for every one of the many mirrors 25,25. It results from five changes to the first embodiment as follows:

1. Many sheaves like sheave 24 are provided, one for each mirror 25.

2. Instead of being driven by a drum like drum 22, cables like cable 23 are wrapped around mast 12, one end clockwise and the other end counterclockwise.

3. Control motor 21 is located on the ground in such a way as to be able to impose an in-plane displacement of the ring up to an amount limited by excessive tension in rods 18,18.

4. Instead of being mounted rigidly on a section of ring 20, each of the mirrors 25,25 is fixed to its driving sheave and the two, together, are mounted on bearings around ring 20.

5. Bearings 19,19 are eliminated.

The combination of these five changes produces no change in the overall result, namely, that motor 21 has control of focal length L by changing the tilt angle $\phi$ of each mirror 25. To best understand this, it is necessary to visualize the above-mentioned in-plane displacement of the ring.

To do this, consider the ring 20 and rods 18,18 to be like the hub and spokes of a bicycle wheel, respectively. In a bicycle wheel, the spokes are not perfectly radial but tend to form triangles. These triangles add in-plane rigidity to the wheel; without this rigidity in a bicycle wheel, the bicycle rider who applied his brakes at the hub would discover that the rim would advance slightly ahead of hub rotation and this might cause excessive spoke tension. The resulting winding up of the rim relative to the hub is called in-plane displacement. In this embodiment, it is important that the rods are radial and that a small amount of in-plane displacement is allowed to occur.

If, say, five degrees of in-plane displacement angle are imposed by a ground-mounted control motor, each combination of sheave 24 and mirror 25 will tilt by some amount; if the diameter of sheave 24 is the same as the outside diameter of mast 12, this amount of change of tilt would also be five degrees. This relationship results from the way the cables like cable 23 are wrapped around mast 12; i.e., one end is wrapped one way and the other end the other way.

An example of causing something to rotate by means of a cable having ends wrapped around drums in opposite directions has already been described; it was used to rotate plate 26 relative to disc (sheave) 14 by cable 39 wrapped oppositely around two drums 38,38. In the second embodiment, the mast 12 cooperates with sheave 24 in the same manner as drums 38,38 cooperated with disc 14.

The above paragraphs describe the second embodiment in terms of how it differs from the first embodiment. In the paragraphs which follow, the second embodiment is described in detail by means of an independent explanation using FIG. 3.

The structural base of the apparatus is a vertical mast 12 with its lower end mounted in the ground. Rigidly attached to this mast in horizontal planes are a lower hub disc, an upper hub disc 14, a bearing on the upper hub disc to support a rotatable plate 26, and a flange to support a swivel means. At the top of the mast is mounted a boiler.

By means of tension rods 18, 18 which are attached to the upper and lower hub discs and which lie in planes that are purely radial to the mast 12, a large ring 20 is held in a horizontal plane concentric to the mast. The arrangement of this combination of discs, rods and ring is very similar to the arrangement of hub flanges, spokes and rim of a bicycle wheel except that the purely radial rods 18 allow one mode of freedom that does not exist between the rim and the non-radial spokes of a bicycle wheel. This mode of freedom is an in-plane rotational advancement of the ring by some angle, $\alpha$ as the rod positions become non-radial. This is permitted by some stretching of the rods 18, 18.

A number of mirrors 25, 25 are mounted on the ring 20 for rotation about lines tangent to the central fiber of the ring. If the ring is tubular so as to have no central fiber, the axis of rotation of each mirror is the axis of the cylinder formed by neglecting the curvature of a small confronting segment of the ring. A sheave or pulley 24 is attached to the mounting structure at each mirror 25 and is concentric to the axis of the small confronting segment of ring. A radial cable or belt 23$b$ engages or wraps around pulley 24. The array of mirrors 25, 25 form a large concave reflector. Therefore, the effect of increasing or decreasing the radial distance from the mast 12 of a point on the radial cable 23$b$ is to change the effective focal length of this large sunlight reflector by means of a change of an angle, $\phi$ of the position of each mirror 25.

There is one radial cable 23$b$ for each ring-mounted mirror 25. One end of each radial cable 23$b$ is attached to the mast using a clockwise-wrapping means and the other end uses a counterclockwise attachment in plan view. The clockwise direction is reserved for ends coming in from one direction only. Therefore, if an in-plane rotational advancement of the ring occurs relative to the mast, one end of each radial cable 23$b$ will tighten and the other end of it will loosen; therefore, the inversion angle $\phi$ of each mirror will change.

At one point on the ring 20, there is an attachment means for a tangential cable 23a. This tangential cable is driven by a focal length control motor 21 which drives pulley 22 and which may be mounted on the ground. To the extent that the control motor can overcome the tension on the radial rods 18, 18, the ring 20 is forced into some in-plane displacement, pulley 24 is turned to some angle, $\phi$, and focal length can be adjusted.

An intermediate reflector is needed to redirect onto the boiler the sunlight coming from the mirrors 25, 25. This intermediate reflector is mounted on a boom 30 which is hinged at plate 26 and supported by the swivel means associated with the flange on the mast. A control motor 37 on the plate 26 uses the rim of the upper hub disc 14 to control the azimuth angle, $\psi$ of the boom 30. Two other control motors are used to focus the sunlight on the boiler, one to control the elevation or pitch angle, $\theta$ of the boom 30 and the other to control the angle, $\beta$ of the intermediate reflector carried by this boom. With this apparatus, if the proper inputs are fed into the four control motors described, much radiation from the sun will be directed onto the boiler for any direction of sunlight.

A third embodiment resembles either the first or second except that the large tubular ring 20 is not held in a horizontal plane. The mast may still be vertical but it supports an axis that is inclined to the horizontal by some angle $\lambda$. This axis would generally lie in a north-south plane. The plane of ring 20 not only contains this axis but also dips or teeters about it, usually assuming one of a limited number of positions. If it had just two possible positions, it would dip down on one side in the morning and on the other side in the afternoon. This inclined axis forms what is called a teetering hinge; the angle by which ring 20 dips toward one side of the teetering hinge is called the teetering angle $\tau$.

Table I includes $\tau$ along with the other four controlled angle functions. Unlike the other four, however, $\tau$ may be controlled manually. An attendant might simply crank the ring to one detent position in the morning and to the other of two possible positions in the afternoon.

In this discussion, a control motor is understood to mean any of a wide variety of means for actuation. It can be a servo motor, a stepping motor, a hydraulic actuator or a gravity-fed dashpot.

I claim:

1. Apparatus for solar thermal conversion comprising;
   a mast protruding from the ground;
   a ring-like structure encircling said mast;
   a plurality of mirrors mounted on said ring-like structure;
   a body to be heated mounted on said mast;
   a beam rotatably mounted on said mast;
   a tiltably controlled reflector mounted at the extremity of said beam; and
   control means enabling the sunlight reflected from said mirrors to be directed by said reflector onto said body to be heated.

2. Apparatus in accordance with claim 1 wherein said mast is vertical and has said body to be heated mounted at its upper end where most of the reflected light converges.

3. Apparatus in accordance with claim 2 wherein said beam is mounted on said mast for controlled azimuth alignment with the plane containing both the sun and said mast and wherein said beam also has a horizontal hinge for controlled inclination from said mast so that said reflector receives most of the sunlight reflected from said mirrors.

4. Apparatus in accordance with claim 1 wherein most reflected light converges at some point between said body to be heated and said reflector.

5. Apparatus in accordance with claim 1 wherein said body to be heated is a boiler which supplies steam to a means for generating electricity.

6. Apparatus in accordance with claim 1 wherein said body to be heated has a selective surface which freely absorbs the low wavelength energy of sunlight but tends to retard the emission of radiant heat.

7. Apparatus in accordance with claim 1 wherein said ring-like structure is a slender, prestressed ring capable of controlled inversion which causes the sunlight reflected from said mirrors to converge toward a point and which, when changed, causes the distance from the center of said mirrors to this point to change.

8. Apparatus in accordance with claim 1 wherein each of said mirrors has an attached sheave and, together with its sheave, is mounted on said ring-like structure for limited rotation about ring cross section centers so that cables with ends oppositely wound around the mast can respond to forced in-plane displacements of said ring-like structure by exerting tension differences on the sheave of each said mirror to cause changes in mirror tilt and overall focal point distance.

9. Apparatus in accordance with claim 1 wherein control motors control the azimuth angle of said beam, the inclination of said beam, the tilt of said mirror and, to a limited extent, the focal length distance of said plurality of mirrors.

10. Apparatus in accordance with claim 9 wherein said mirrors and said reflector can be protected with dust covers in response to movements of control motors which control beam mirrior mirror and focal length change.

11. A solar heating apparatus comprising;
    a substantially vertical pole,
    a moveable ring encircling and in connection with said pole,
    a plurality of mirrors mounted on said ring and adapted to reflect sunlight,
    a beam connected to said pole, said beam adapted to be moved vertically and horizontally about said pole,
    a reflector connected to said beam, said reflector adapted to receive reflected sunlight from said mirrors, and
    a body associated with said pole, said body adapted to receive reflected sunlight from said reflector and to convert this sunlight into useable energy.

* * * * *